US008369041B2

(12) United States Patent
Sutardja et al.

(10) Patent No.: US 8,369,041 B2
(45) Date of Patent: Feb. 5, 2013

(54) METHOD AND APPARATUS FOR REDUCING REPEATABLE RUNOUT IN STORAGE SYSTEMS

(75) Inventors: Pantas Sutardja, Los Gatos, CA (US); Yuan Zheng, Fremont, CA (US); Yong Huang, Fremont, CA (US); Qiuliang Fu, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/400,386

(22) Filed: Feb. 20, 2012

(65) Prior Publication Data
US 2012/0147495 A1 Jun. 14, 2012

Related U.S. Application Data

(63) Continuation of application No. 12/392,872, filed on Feb. 25, 2009, now Pat. No. 8,120,871.

(60) Provisional application No. 61/054,697, filed on May 20, 2008.

(51) Int. Cl.
*G11B 5/596* (2006.01)
(52) U.S. Cl. .................................. 360/77.04; 369/53.14
(58) Field of Classification Search .......................... None
See application file for complete search history.

(56) References Cited

U.S. PATENT DOCUMENTS

| 6,069,764 | A | 5/2000 | Morris et al. |
| 6,147,944 | A | 11/2000 | Kwon et al. |
| 7,286,317 | B1 | 10/2007 | Li et al. |
| 7,663,835 | B1 | 2/2010 | Yu et al. |
| 2002/0024899 | A1* | 2/2002 | Cho et al. .................... 369/44.32 |
| 2002/0109932 | A1 | 8/2002 | Aikawa et al. |
| 2003/0184908 | A1* | 10/2003 | Hsin ......................... 360/77.04 |
| 2003/0184909 | A1 | 10/2003 | Zhang et al. |
| 2003/0193736 | A1 | 10/2003 | Min et al. |
| 2004/0228026 | A1 | 11/2004 | Chang et al. |
| 2005/0046994 | A1 | 3/2005 | Hanson et al. |

* cited by examiner

Primary Examiner — Andrew L Sniezek

(57) ABSTRACT

A storage system includes a first buffer configured to store a first repeatable runout profile (RRP) for a sector of a rotating storage medium. A second buffer is configured to store a second RRP for the sector. A controller: controls a servo of the rotating storage medium based on the first RRP during a first revolution of the rotating storage medium; and learns the second RRP (i) while operating in a track-following mode, and (ii) during the first revolution. The controller ceases learning of the second RRP when one of (i) the controller is operating in a seek mode and (ii) the rotating storage medium is in an off-track state. Subsequent to the first revolution of the rotating storage medium and based on whether the learning of the second RRP was stopped during the first revolution, the controller replaces the first RRP with the second RRP in the first buffer.

20 Claims, 8 Drawing Sheets

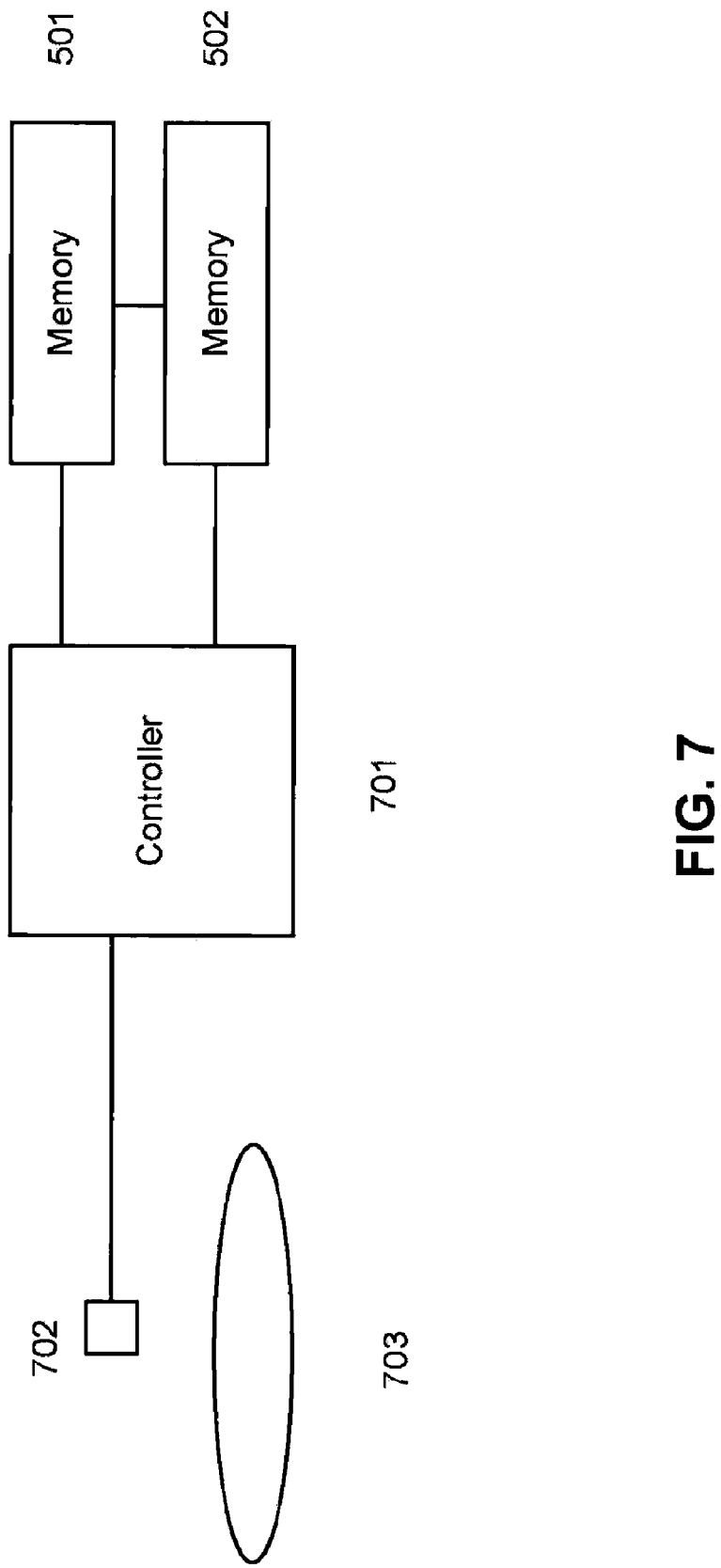

METHOD AND APPARATUS FOR REDUCING REPEATABLE RUNOUT IN STORAGE SYSTEMS

CROSS-REFERENCE TO RELATED APPLICATIONS

This application claims the benefit of priority to U.S. patent application Ser. No. 12/392,872 (now U.S. Pat. No. 8,120, 871), filed Feb. 25, 2009. U.S. patent application Ser. No. 12/392,872 claims the benefit of priority to previously filed U.S. provisional patent application Ser. No. 61/054,697, filed May 20, 2008, entitled APPARATUS TO ROBUSTLY REDUCE THE REPEATABLE RUNOUT DISTURBANCES IN DISC BASED SERVO SYSTEM WITH FAULT-TOLERANCE CAPABILITY. The disclosures of the above applications are incorporated herein by reference in their entirety.

FIELD

The present disclosure relates generally to disc based servo systems, and more particularly to reducing repeatable runout (RRO) in disc based servo systems.

BACKGROUND

A storage servo system is used to reduce mechanical displacement mismatches between an actual position of a read/write head and a target position of the head. The mechanical displacement mismatches, or disturbances, in a servo system may include RRO and non-repeatable runout. Repeatable runout may be caused by disc irregularity, disc eccentricity and/or spindle axis assembly (mechanical misalignments) and are repeatable in each spindle rotation. Non-repeatable runout is not synchronized with disc sectors, e.g., unmodeled dynamics.

Some hard disk drives (HDDs) use a frequency domain multiple sine wave synthesizing method for feed-forward RRO disturbance control. This method needs significant processing power to generate multiple sine waves and calculate the phase and magnitude for each sine wave to compensate for repeatable runout.

A removable disc is not fixed to any storage system and may be loaded into a storage system when needed. Examples of removable disc storage systems may include CD-ROM drives and DVD drives. Some people believe that disturbances in removable disc storage systems are not predictable, and that repeatable runout control (RROC) in removable storage systems is impossible, because the recording media is removable and the loader mechanism is low cost. Others are trying to implement RROC in removable disc storage systems using the above-described magnetic storage approach, using a high bandwidth feedback control loop with a high sampling rate. However, with the high sampling rate, such an approach is prohibitively expensive.

Therefore, it may be desirable to provide a method and apparatus for reducing RRO in removable disc storage systems.

SUMMARY

A storage system is provided and includes a first buffer configured to store a first repeatable runout profile for at least one sector of a rotating storage medium. A second buffer configured to store a second repeatable runout profile for the at least one sector. A controller is configured to control a servo of the rotating storage medium based on the first repeatable runout profile during a first revolution of the rotating storage medium. The controller is also configured to learn the second repeatable runout profile (i) while operating in a track-following mode, and (ii) during the first revolution. The controller is further configured to cease learning of the second repeatable runout profile when one of (i) the controller is operating in a seek mode and (ii) the rotating storage medium is in an off-track state. Subsequent to the first revolution of the rotating storage medium and based on whether the learning of the second repeatable runout profile was stopped during the first revolution, the controller is configured to replace the first repeatable runout profile with the second repeatable runout profile in the first buffer.

In other features, a method is provided and includes storing a first repeatable runout profile for at least one sector of a rotating storage medium in a first buffer. A second repeatable runout profile is stored for the at least one sector in a second buffer. A servo of the rotating storage medium is controlled based on the first repeatable runout profile during a first revolution of the rotating storage medium. The second repeatable runout profile is learned (i) while operating in a track-following mode, and (ii) during the first revolution. The method further includes ceasing to learn the second repeatable runout profile when one of (i) the controller is operating in a seek mode, and (ii) the rotating storage medium is in an off-track state. Subsequent to the first revolution of the rotating storage medium and based on whether the learning of the second repeatable runout profile was stopped during the first revolution, the first repeatable runout profile is replaced with the second repeatable runout profile in the first buffer.

In other features, a method for reducing repeatable runout (RRO) is provided and may include: learning an RRO profile of at least two sectors in a removable disc; forming a repeatable runout control (RROC) profile for the at least two sectors; assembling the RROC profile of the at least two sectors into an RROC profile for the removable disc; and storing the RROC profile for the removable disc in a first memory to provide a feed-forward control effort in time domain to suppress the RRO. A removable disc may be, e.g., an optical, a magnetic or a magneto-optical disc.

In one aspect, one of the at least two sectors may be a target disc sector, and the method may include providing a feed-forward control effort to suppress the RRO for the target disc sector when a head reaches the target disc sector.

The method may include providing a feed-back control effort to suppress non-repeatable runout for the target disc sector after the head reaches the target disc sector.

The method may include separating RRO from non-repeatable runout for the target disc sector.

The method may include adapting the feed-forward control effort of the target disc sector to match the RRO of the target disc sector.

The method may include storing the feed-forward control effort which matches the RRO of the target disc sector in a second memory to adaptively adjust the RROC profile.

The method may include promoting the RROC in the second memory to the first memory after a spindle revolution.

The method may include removing a direct current (DC) element of the RROC profile from the RROC profile before the promoting.

The method may include stopping the learning when the head is off-track.

A servo system may include a first memory for storing a repeatable runout control (RROC) profile which provides a feed-forward control effort to suppress repeatable runout (RRO) of a target disc sector of a removable disc when a head reaches the target disc sector; and a compensator for receiving an error signal and providing a feed-back control effort to reduce non-repeatable runout.

The server system may further include a low pass filter for separating RRO from the error signal and passing the RRO to the first memory.

The server system may further include a feed-back loop connecting an output of the first memory to an input of the first memory to adapt the RROC of the target disc sector.

The server system may further include a second memory for temporarily storing an RROC profile before a whole revolution is completed.

In one aspect, the compensator may include an infinite impulse response (IIR) filter.

The server system may further include a phase lock loop (PLL) for partitioning the disc into a number of sectors.

BRIEF DESCRIPTION

Implementations are described herein with reference to the accompanying drawings, similar reference numbers being used to indicate functionally similar elements.

FIG. 7 illustrates a removable disc storage servo system according to the present disclosure.

DETAILED DESCRIPTION

A method and apparatus is described for reducing RRO in removable disc storage systems. A disc may be partitioned into a number of equally spaced sectors. An RRO profile may be individually obtained for each sector, a runout control algorithm may be applied to each sector to generate an RROC waveform for the sector to suppress the RRO, and sector RROC waveforms may be assembled into an RROC waveform for a whole revolution and saved in a memory buffer for feed-forward control. The RROC is performed in the time domain, and it may be adapted for each sector to reject the RRO disturbance. The method may achieve better RRO rejection through an adaptive feed-forward and feedback servo architecture with minimal control bandwidth and minimal sampling rate; may reduce implementation cost through reduced memory usage by employing time domain adaptation for feed-forward control which may require in one implementation an array of memory buffers; may avoid synthesizing multiple sine waves; and may improve system robustness against servo conditions by disabling adaptive learning during its seek mode, settle mode, defect mode and/or an off-track servo failure.

Figure 1A:
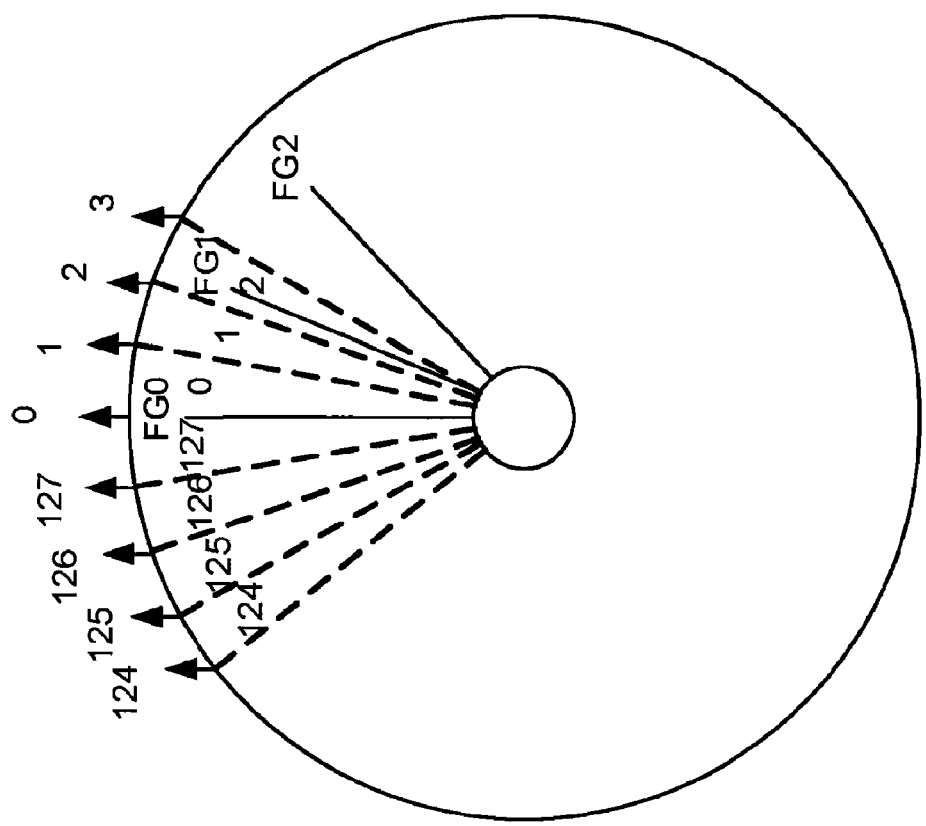
FIGS. 1A and 1B illustrate a method for partitioning a disc into equally-distributed sectors.
Figure 1B:
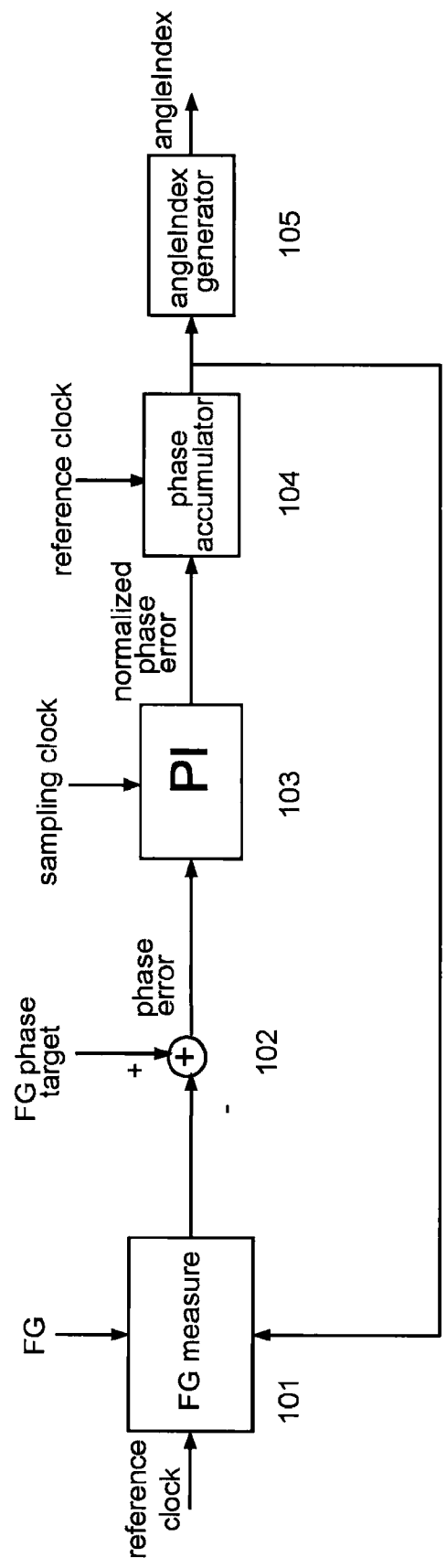

FIGS. 1A and 1B illustrate a method for partitioning a disc into sectors.

Since repeatable runout at a location on a removable disc, e.g., an optical disc, may occur each spindle rotation, the disc may be divided into a group of sectors (e.g., which may be equally spaced and/or equally sized, but not limited as such) for RROC waveform shaping, as shown in FIG. 1A. Each sector may need a memory to store its RROC value (or profile). Therefore, the greater the number of sectors, the bigger the memory size required, and the finer the resolution of the RROC. The number of sectors may be a trade-off between the RROC resolution and memory cost. The implementation shown in FIG. 1A divides a disc into 128 sectors, but the number of sectors may be programmable and may have other values, e.g., 64 or 32.

Sector partitioning of a disc may be achieved by various methods. In one implementation, an angle index phase lock loop (PLL) algorithm may be used to generate a sequence of signals from a given hardware signal from a loader assembly, so as to partition a disc into equally spaced sectors. A spindle motor driver in a storage loader assembly may provide a sequence of pulses, called Frequency Generator (FG), and there may be 18 FG pulses per disc revolution for most of the popular motor drive ICs. The rising edges of some FG signals are shown in FIG. 1A. Although the FG pulses may not be evenly distributed in one revolution, the phase position of each FG may remain substantially the same for each individual loader. The fixed phase position of FG pulses may be used to partition the disc into equally spaced and/or sized sectors.

If the angle (or phase) of a disc is a floating point number (or normalized value) 1.0, which may be converted into a fixed point representation by m-bit (for example m=32), the kth sector phase position may be k/N, where N is the total number of sectors in one revolution. The time interval for a sector may be measured with a reference clock. In one implementation, the PLL algorithm may be implemented in hardware, and a faster reference clock, e.g., in the MHz level, may be chosen to generate a fine resolution of sector partition with fine resolution of jitter on each sector boundary. In one implementation, the PLL algorithm may be implemented in software, and a slower reference clock, e.g., 88 KHz, may be used. The normalized phase for the time interval may be obtained by dividing the time interval by the time for an entire disc rotation, regardless of the spindle speed.

As shown in FIG. 1B, an FG measure module 101 may receive a reference clock and the FG pulses to generate an actual FG phase.

At a comparator 102, the actual FG phase may be compared with an FG phase target to generate a phase error measurement for the PLL. The FG phase target may be the normalized phase position of the FG pulses in the initial rotation.

A Proportional-Integral (PI) compensator 103 running at a fixed sampling rate (1 KHz) may be used in the PLL to provide a normalized phase error. The transfer function of the PI compensator 103 with a sampling rate of 1 KHz may be:

$$PI(z^{-1}) = \frac{2^{-18}}{1-z^{-1}} + 2^{-4}$$

A normalized phase accumulator 104 may receive a normalized phase error measured at each FG pulse from the PI compensator 103 and a reference clock, and predict a normalized phase increment adjustment at each reference clock.

The phase increment at each reference clock may be preset based on the normalized phase calculation. This phase increment value may be adjusted by the PLL. The PLL may synchronize, or phase lock, the normalized phase accumulation in the reference clock domain with the FG phase rotation in the FG pulse domain.

The spindle speed change may be a main distortion to the normalized phase definition. Since the PLL bandwidth may be much larger than the spindle speed change, it may be more than enough to use PLL to compensate for the phase distortion from the spindle speed change. In other words, the PLL may track the spindle speed change with a reasonably small tracking error. As will be described below, the adaptive RROC may tolerate this small PLL tracking error during the disc sector partition.

An angle index generator 105 may generate sector angle index pulses from the output of the normalized phase accumulator 104 by taking out its n-MSB.

Figure 2:
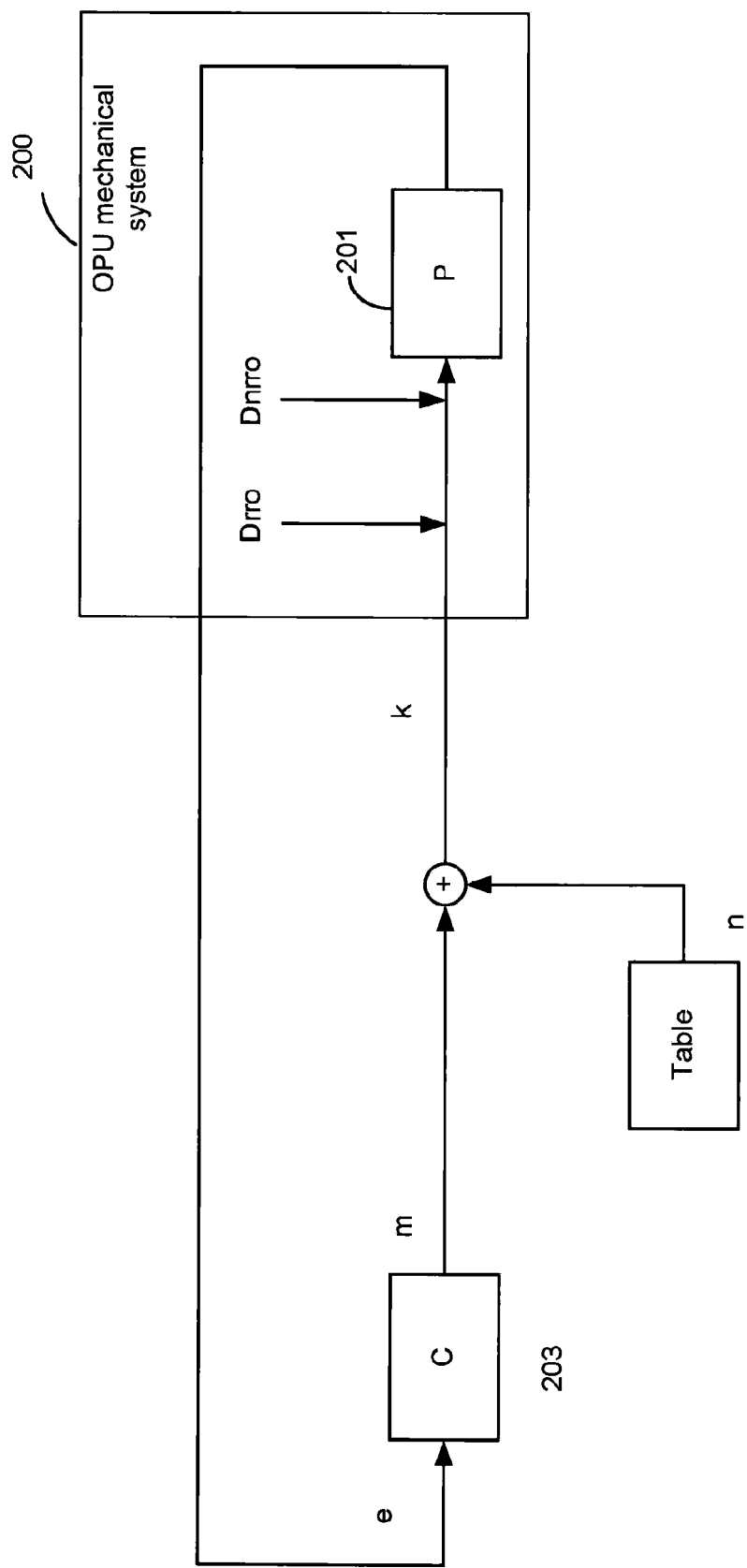
FIG. 2 illustrates a servo control architecture for a removable disc storage system according to the present disclosure.

FIG. 2 illustrates the architecture of a servo control system for a removable disc storage system. The removable disc may be an optical disc, although the servo control system may be used with other types of removable discs. The system may be a focus or radial servo system, and may use feedback to reject non-repeatable runout (Dnrro) and feed-forward to reject repeatable runout (Drro). A plant of an optical pick-up unit (OPU) system 200 may be modeled by a plant dynamic P 201 and two disturbances: Drro and Dnrro.

A table 202 may be used as a feed-forward controller and may be an RROC profile. The table 202 may be a static runout profile obtained in advance in an open loop. As shown in FIG. 1A, a disc may be partitioned into 128 equally spaced sectors. An RRO profile may be individually obtained for each sector, a runout control algorithm may be applied to each sector to generate an RROC waveform for the sector to suppress its RRO, and sector RROC waveforms may be assembled into an RROC waveform for an entire revolution and saved in a memory buffer for feed-forward control. In one implementation, the runout control algorithm may generate an opposite waveform for RRO, i.e., by constructing a waveform that is the same as the RRO profile but with a 180° phase difference, so as to eliminate repeatable or predictable disturbances. The RROC waveform for a sector, which may provide a feed-forward control effort to suppress RRO in the sector, may be saved as an entry in the table 202. Implementations for generating and adapting the RROC waveform will be described below in more detail with reference to FIGS. 3, 4 and 5.

In operation, the table 202 may receive information indicating the target disc sector and provide a control effort n to suppress the Drro for the target disc sector for feed-forward control when the head reaches the target disc sector. At the same time, a closed loop feedback compensator C 203 may receive an error signal e from the plant, which ideally may only include Dnrro if Drro is already successfully suppressed by the control effort n, and generate a control effort m to correct Dnrro. In one implementation, the compensator C may be a high order IIR (Infinite Impulse Response) filter.

Figure 3:
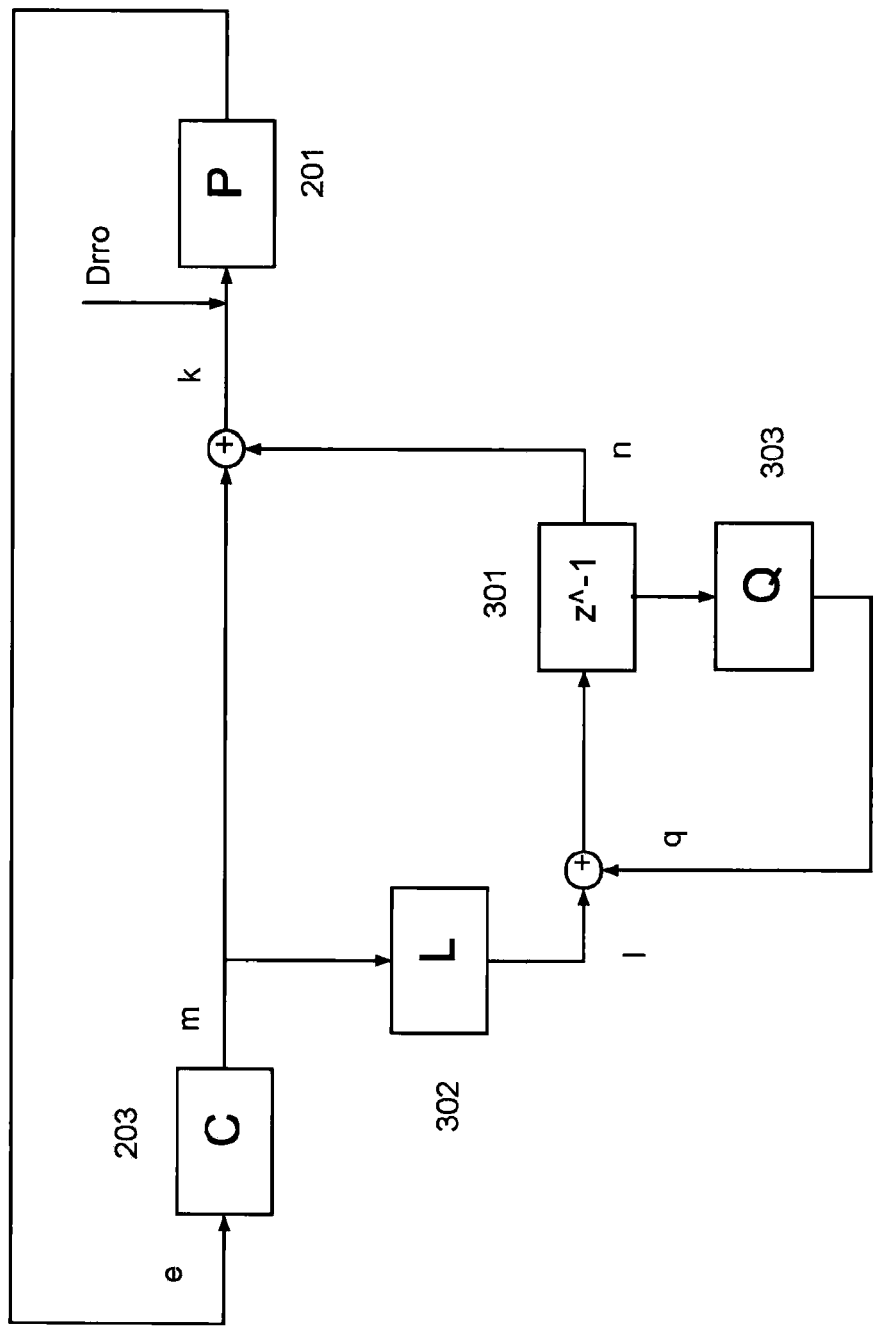
FIG. 3 illustrates a servo control architecture for a removable disc storage system with adaptation according to the present disclosure.

FIG. 3 illustrates the architecture of a servo control system for a removable disc storage system with adaptation. The system shown in FIG. 3 may adapt the RROC waveform in FIG. 2 to increase the system's robustness against errors, e.g., errors in sector partition and various system variations.

In particular, the table 202 in FIG. 2 may be replaced by the memory buffer, the element of which can be represented by a single variable $z^{-1}$ 301 with an adaptation law. The adaptation law may be a runout adaptation feedback loop with a filter Q 303, which runs much more slowly than the feedback loop with the compensator C 203. The single variable $z^{-1}$ may correspond to an entry in the table pointed by the target disc sector. The variable $z^{-1}$ may be updated once per spindle revolution and the update may be pure accumulation. Similarly to the system shown in FIG. 2, $z^{-1}$ may provide a feed-forward control effort n to suppress Drro for the target disc sector when the head reaches the target disc sector. When the head reaches the target disc sector, the compensator C may receive an error signal e, which may include Dnrro, and provide a control effort m to suppress the Dnrro.

If the system does not have a runout adaptation feedback loop or the runout adaptation feedback loop can not achieve enough performance, Drro may show up in the error signal e. For example, when the feedback loop with the compensator C is just closed, the error signal e may include not only Dnrro, but also Drro. If the error signal e is contaminated with Drro, neither the control effort m for Dnrro nor the control effort n for Drro is reliable. Adaptation may be used to learn the true Drro and keep reducing the effect of Drro until the error signal e is free of Drro.

Figure 4:
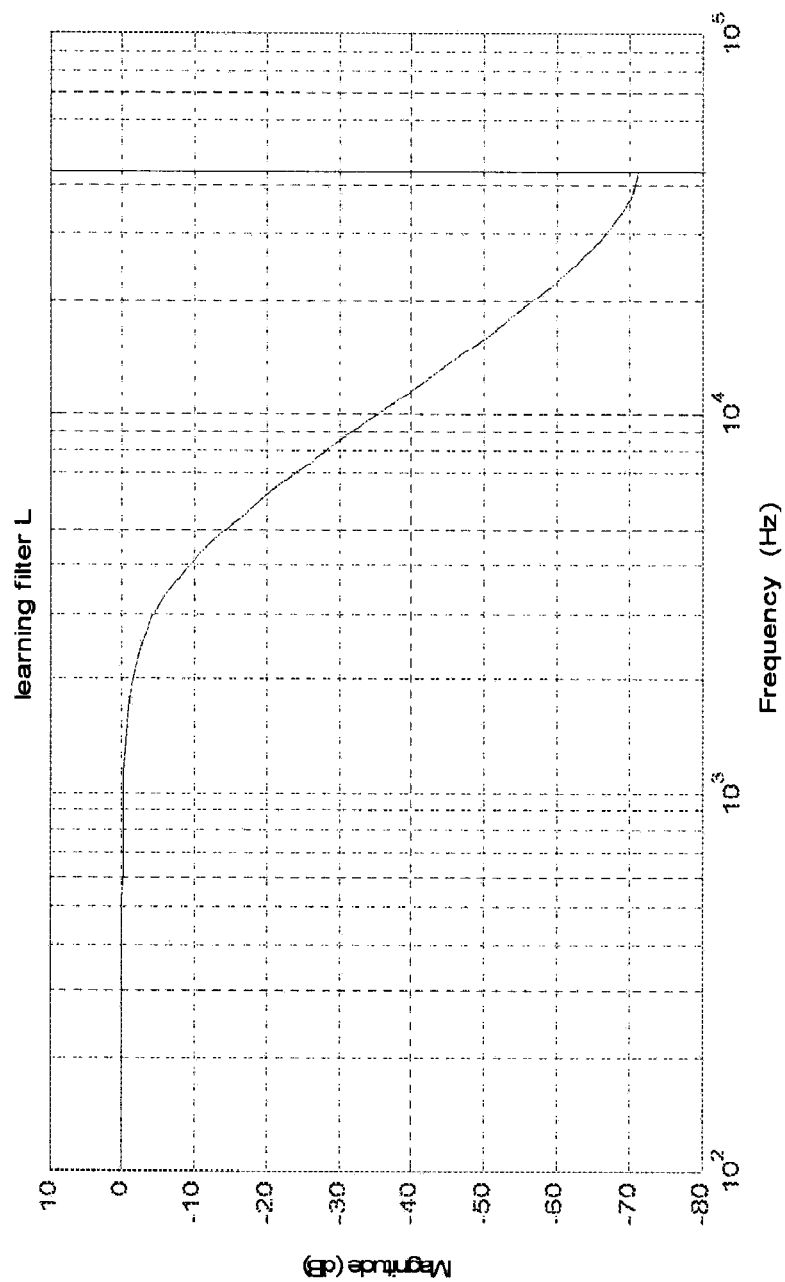
FIG. 4 illustrates an exemplary frequency response of a filter used in the servo control architecture of FIG. 3.

Since Dnrro is usually high frequency, and Drro is usually low frequency, a low pass filter L 302 may be used to pass only Drro to $z^{-1}$. In one implementation, the filter L may be a fourth order IIR filter with cut-off bandwidth of 2 Khz. Its exemplary frequency response is shown in FIG. 4, and its transfer function may be:

$$\frac{0.003036}{1 - 3.24z^{\wedge} - 1 + 3.974z^{\wedge} - 2 - 2.187z^{\wedge} - 3 + 0.4557z^{\wedge} - 4}$$

The filter L may also help to reduce aliasing caused by the gap between a high sampling rate in the feedback loop with the compensator C and a low update rate of the runout adaptation feedback loop. The feedback loop with the compensator C may be running at a high sampling rate, e.g., 88 KHz, 176 KHz or 352 KHz, and may be independent of the spindle speed. However, the update rate of the runout adaptation feedback loop with the filter Q may be much lower than the sampling rate, e.g., about 20 KHz for a 16× DVD. In addition, the update rate of the runout adaptation feedback loop may be determined by a spindle angular speed, since the RRO profile is learned and stored sector by sector, and the sector period may become shorter if the spindle rotates faster.

The filter Q may be an FIR (Finite Impulse Response) filter and may be used in the runout adaptation feedback loop to match the control effort n to Drro. In one implementation, Q=1, the value of $z^{-1}$ may be added to the output/from the filter L as a feed-back, and the control effort n may keep increasing until it can suppress Drro. When the control effort n can suppress Drro, the error signal e does not have Drro anymore, l=0, $z^{-1}$ and n may reach their ideal values and stay there until Drro appears in the error signal e again.

Thus, even though there may be some errors in the control effort n, the adaptation may still adapt to learn and compensate for Drro. As a result, the runout adaptation feedback loop may provide an accurate control effort n to suppress Drro, and the feedback compensator C may provide an accurate control effort m to eliminate the non-repeatable runout Dnrro, the system may achieve the maximum disturbance reduction, and its robustness against disturbances may be increased.

Figure 5:
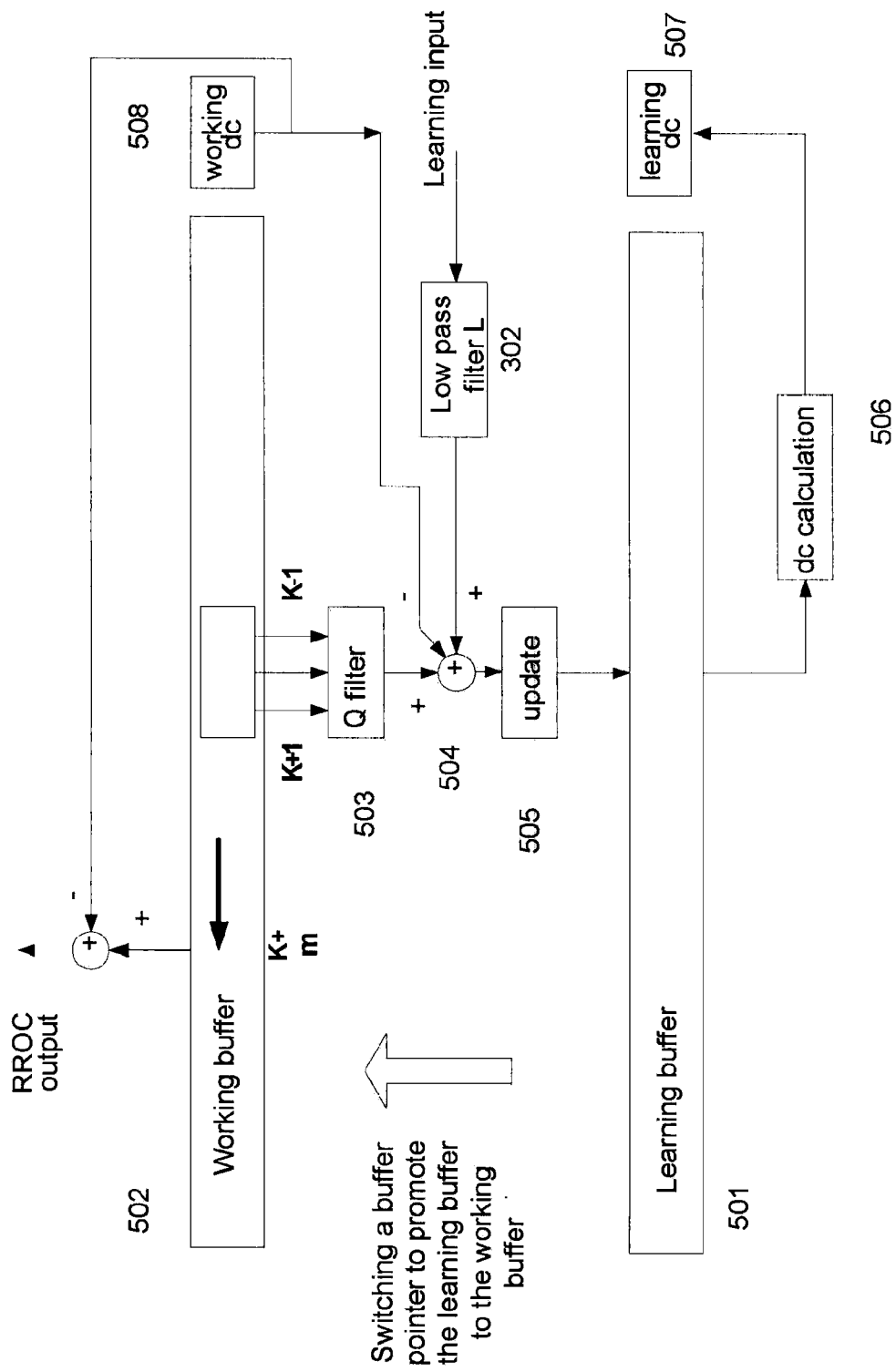
FIG. 5 illustrates an architecture for dual buffer based iterative learning according to the present disclosure.

FIG. 5 illustrates an architecture for dual buffer based iterative RROC learning.

The adaptive RROC learning process described with reference to FIG. 3 may be disrupted by various events during drive operation. In one implementation, to prevent bad RROC learning results from being stored and used in feed-forward control, the RROC learning may be allowed when the servo is in the track-following mode with good radial lock performance, and stopped when a seek operation or off-track condition happens. In one implementation, when an unexpected off-track condition happens, the bad RROC learning results may be replaced by a RROC profile obtained during a previous rotation.

As shown, the architecture for dual buffer based iterative RROC learning may maintain two memory buffers for the RROC profile: a learning buffer 501 which may be a temporary buffer used to hold real time RROC learning results; and a working buffer 502 which may be used to hold a mature RROC profile for actual servo control.

After a seek is finished (e.g., indicated by a timing lock or PSN decode), the track-following may start and the learning process may start at the same time. The learning process needs to use the working buffer 502 obtained during the previous rotation as the base for the RROC learning. Every FIQ (Fast Interrupt Request), the RROC profile may be output with the output pointer pointing to the target RROC element designated by an angle index K. The working buffer 502 may provide a feed-forward control effort n for the target sector K, while learning the RRO profile of the sector K during the current rotation.

In one implementation, when learning the RROC profile for the target sector, its neighboring sectors may be considered to tolerate adaptation mistakes, for example, mistakes in the spindle spin up or spin down process. In one implementation, the value of $z\hat{}-1$ for the previous sector K−1, the target sector K and the next sector K+1 may be sent to a Q filter 503, and the Q filter 503 may use a weighted average of the control effort for the three sectors, with the weight for the target sector having the biggest value. In one implementation, the weights for the previous, target and next sector may be 0.25, 0.5 and 0.25 respectively, and the Q filter for the kth sector may be calculated as follows:

$$Q_k = \frac{x_{k+1} + x_{k-1}}{4} + \frac{x_k}{2},$$

wherein $X_k$ is the kth entry in the RROC profile.

The output of the filter Q 503 may be combined with the signal/from the filter L 302 at 504 and the combination may become an update 505 of $z\hat{}-1$ of the target sector. The update of $z\hat{}-1$ may be stored in the learning buffer 501, and the working buffer 502 may continue to the next disc sector K+1. The learning buffer 501 may hold the temporary RROC profile during the real time learning, but the temporary RROC profile may not be used for servo control.

When the learning is completed after the next complete spindle revolution, the temporary RROC profile in the learning buffer 501 may be promoted to the working buffer 502 as an updated RROC profile by, e.g., swapping pointers. The updated RROC profile may be used for real time servo control. Since the working buffer 502 is not updated until the next complete spindle revolution is finished, it might not contain bad RROC learning results.

During a high speed operation, track slips may happen during seek settle. Track detection algorithms might not detect slips immediately without any false detection, and there may be a detection delay to reduce the possibility of false detection. This detection delay may cause the RROC profile to be corrupted if a single-buffer adaptive RROC architecture is used.

With the dual buffer based iterative learning architecture of FIG. 5, once a track slip is detected during the RROC learning, the learning process may be stopped immediately. Since the track slip detection delay window is less than one revolution, the learning mistake due to the track slip detection delay may be saved in the learning buffer 501, but might not be updated to the working buffer 502. This approach provides robust protection for the RROC profile in the working buffer 502.

Thus, the architecture shown in FIG. 5 may update the RROC profile each spindle revolution, while learning may take place per disc sector within each spindle revolution. The learning process may be iterative per revolution. If the learning process is less than 1 revolution before it is disrupted by any off-track condition, the learned RROC profile cannot be moved to the working buffer 502 and cannot be used for servo control.

The control effort m may be contaminated with a DC signal 508 which may be shared by all elements in the RROC profile. If the DC signal is not removed, it may be saved in the memory buffers and affect accuracy of the servo control. In one implementation, the RROC profile and the associated DC signal may be learned at the same time and stored in the learning buffer 501. Once a whole revolution is completed, the DC signal for the whole RROC profile may be calculated at 506. When the RROC profile in the learning buffer 501 is promoted to the working buffer 502, the DC signal may be removed at 507.

Figure 6:
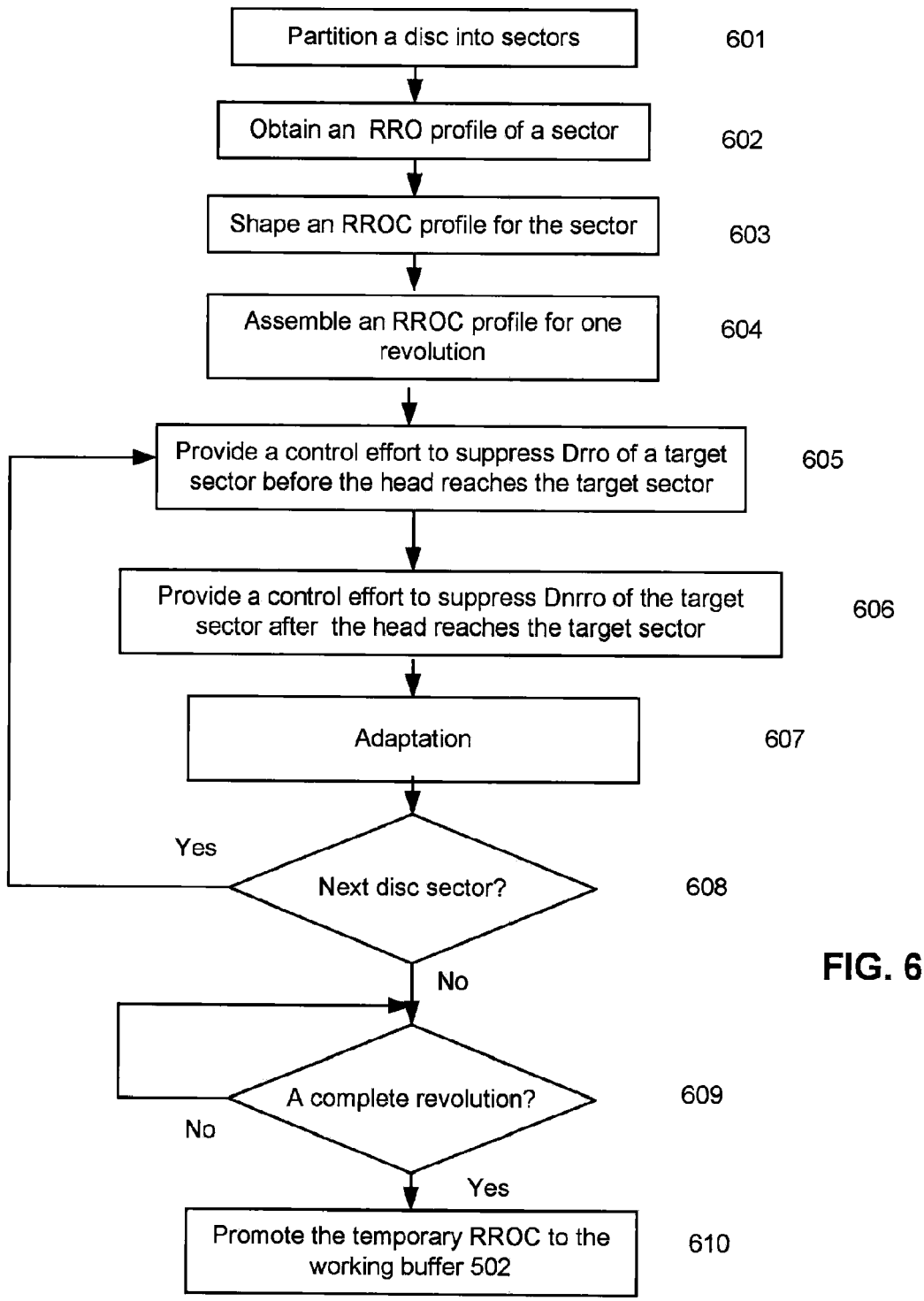
FIG. 6 illustrates a flow chart of a method for reducing RRO according to the present disclosure.

FIG. 6 illustrates a flow chart of a method for reducing RRO.

At 601, a removable disc may be divided into a number of sectors (in one implementation, 128 sectors) with the method shown in FIGS. 1A and 1B.

At 602, an RRO profile may be obtained for each sector of the disc when the servo system shown in FIGS. 3 and 5 is in an open loop condition.

At 603, an RROC profile may be shaped for each sector of the disc.

At 604, an RROC profile for the whole revolution may be assembled from the sector RROC profiles, and saved in the working memory 502 for feed-forward control.

At 605, the servo system shown in FIGS. 3 and 5 may be closed. When the read/write head is moving toward the target disc sector, $z\hat{}-1$, an entry in the previously stored RROC profile table corresponding to the target disc sector, may provide a feed-forward control effort n to suppress Drro for the target disc sector.

At 606, as soon as the read/write head reaches the target disc sector, the compensator C may provide a control effort m to reduce Dnrro for the target disc sector.

At 607, the low pass filter L may pass Drro in the error signal e to $z\hat{}-1$ for adaptation. Adaptation may continue until $z\hat{}-1$ for the target disc sector reaches a stable value when the control effort n can suppress Drro, the error signal e does not have Drro contamination anymore and 1 becomes 0. The stable $z\hat{}-1$ may be saved in the memory 501 as an update of $z\hat{}-1$ for the target disc sector.

At 608, it may be determined whether the head is moving to the next disc sector. If yes, the process may return to 605.

Otherwise, at 609, it may be determined whether a whole revolution has been completed.

If a whole revolution is completed, at 610, the temporary RROC in the learning buffer 501 may be promoted to the working buffer 502, and may be used in actual servo control.

FIG. 7 illustrates a removable disc storage servo system. As shown, a controller 701 may control a read or read/write head 702 to access data on a removable disc 703, e.g., an optical disc, by performing the method shown in FIG. 6. The controller 701 may access the working buffer 502 for the RROC profile for actual servo control, and save a temporary RROC profile in the learning buffer 501. The method of FIG. 6 may be implemented by computer instructions and/or hardware and the controller 701 may include hardware or firmware for executing the instructions.

While at one point a DVD system was used as an example in the foregoing description, the implementations disclosed herein are not limited to an optical system. Other optical disc systems, including but not limited to CD-ROM and Blu-Ray™, and other removable disc systems may benefit from the servo techniques disclosed.

Several features and aspects have been illustrated and described in detail with reference to particular implementations by way of example only, and not by way of limitation. Alternative implementations and various modifications to the disclosed implementations are within the scope and contemplation of the present disclosure.

What is claimed is:

1. A storage system comprising:
 a first buffer configured to store a first repeatable runout profile for at least one sector of a rotating storage medium;
 a second buffer configured to store a second repeatable runout profile for the at least one sector; and
 a controller configured to, during a first revolution of the rotating storage medium, control a servo of the rotating storage medium based on the first repeatable runout profile,
 wherein the controller is further configured to
  learn the second repeatable runout profile (i) while operating in a track-following mode, and (ii) during the first revolution,
  cease learning of the second repeatable runout profile when one of (i) the controller is operating in a seek mode and (ii) a read and write head of the storage system is in an off-track state, and
  subsequent to the first revolution of the rotating storage medium and based on whether the learning of the second repeatable runout profile was stopped during the first revolution, replace the first repeatable runout profile with the second repeatable runout profile in the first buffer.

2. The storage system of claim 1, wherein the controller is configured to, subsequent to the first revolution, control the servo of the rotating storage medium based on the second repeatable runout profile.

3. The storage system of claim 1, wherein the controller is configured to:
 refrain from replacing the first repeatable runout profile with the second repeatable runout profile when the learning of the second repeatable runout profile was stopped during the first revolution; and
 subsequent to the first revolution of the rotating storage medium and when the learning of the second repeatable runout profile was stopped during the first revolution, control the servo of the rotating storage medium based on the first repeatable runout profile.

4. The storage system of claim 1, wherein the controller is configured to, subsequent to operating in the seek mode during the first revolution, (i) operate in the track-following mode, and (ii) learn the second repeatable runout profile of the at least one sector based on the first repeatable runout profile.

5. The storage system of claim 1, further comprising a first filter configured to:
 receive feedforward control values for each of (i) a previous sector, (ii) a current sector, and (iii) a next sector; and
 determine a weighted average based on the feedforward control values,
 wherein the controller is configured to update the second repeatable runout profile based on the weighted average.

6. The storage system of claim 5, further comprising a summer configured to sum a first output of the first filter, a second output of a second filter, and a direct current element of the second repeatable runout profile,
 wherein the controller is configured to update the second repeatable runout profile based on an output of the summer.

7. The storage system of claim 6, further comprising a compensator configured to generate a feedback control signal in response to an error signal, wherein:
 the error signal is received from a device modeling an optical pick-up system; and
 the second filter is configured to generate the second output in response to the feedback control signal.

8. The storage system of claim 1, wherein the controller is configured to (i) detect a slip in a track of the rotating storage medium during the first revolution, and (ii) stop the learning of the second repeatable runout profile upon detecting the slip in the track.

9. The storage system of claim 1, further comprising a feedback loop comprising:
 a device configured to (i) model an optical-pickup system, and (ii) generate an error signal in response to the first repeatable runout profile;
 a compensator configured to generate a feedback control signal in response to the error signal; and
 a feedforward control device configured to, based on an output of the compensator, generate a feedforward control signal to suppress repeatable runout associated with the at least one sector,
 wherein the device, configured to model the optical-pickup system, is configured to generate the error signal based on (i) the feedback control signal, and (ii) the feedforward control signal.

10. The storage system of claim 9, further comprising:
 a low pass filter configured to filter the feedback control signal;
 a finite impulse response filter configured to filter an output of the feedforward control device; and
 a first summer configured to sum (i) an output of the low pass filter, and (ii) an output of the finite impulse response filter,
 wherein the feedforward control device is configured to generate the feedforward control signal in response to an output of the first summer.

11. The storage system of claim 10, a second summer configured to sum the feedback control signal and the feedforward control signal,
 wherein the device, configured to model the optical-pickup system, is configured to generate the error signal based on an output of the second summer.

12. The storage system of claim 1, wherein the controller is configured to for each of a plurality of revolutions of the rotating storage medium:
 learn the second repeatable runout profile for a current revolution of the rotating storage medium; and
 subsequent to the current revolution replace the first repeatable runout profile with the second repeatable runout profile.

13. The storage system of claim 1, wherein the controller is configured to:
 learn repeatable runout profiles of two or more of the at least one sector;

assemble the repeatable runout profiles of the two or more of the at least one sector to form the second repeatable runout profile; and subsequent to replacing the first repeatable runout profile with the second repeatable runout profile, suppressing repeatable runout of the two or more of the at least one sector based on the first repeatable runout profile.

14. A method comprising:

storing, in a first buffer, a first repeatable runout profile for at least one sector of a rotating storage medium;

storing, in a second buffer, a second repeatable runout profile for the at least one sector;

during a first revolution of the rotating storage medium, controlling a servo of the rotating storage medium based on the first repeatable runout profile;

learning the second repeatable runout profile (i) while operating in a track-following mode, and (ii) during the first revolution;

ceasing to learn the second repeatable runout profile when one of (i) the controller is operating in a seek mode, and (ii) a read and write head of a storage system is in an off-track state; and subsequent to the first revolution of the rotating storage medium and based on whether the learning of the second repeatable runout profile was stopped during the first revolution, replacing the first repeatable runout profile with the second repeatable runout profile in the first buffer.

15. The method of claim 14, further comprising, subsequent to the first revolution, controlling the servo of the rotating storage medium based on the second repeatable runout profile.

16. The method of claim 14, further comprising:

refraining from replacing the first repeatable runout profile with the second repeatable runout profile when the learning of the second repeatable runout profile was stopped during the first revolution; and subsequent to the first revolution of the rotating storage medium and when the learning of the second repeatable runout profile was stopped during the first revolution, controlling the servo of the rotating storage medium based on the first repeatable runout profile.

17. The method of claim 14, further comprising:

receiving, at a first filter, feedforward control values for each of (i) a previous sector, (ii) a current sector, and (iii) a next sector;

determining a weighted average based on the feedforward control values;

generating, via the first filter, a first output based on the weighted average;

generating, via a second filter, a second output in response to a feedback control signal;

generating a third output including summing the first output of the first filter, the second output of the second filter, and a direct current element of the second repeatable runout profile;

updating the second repeatable runout profile based on the third output; and generating the feedback control signal in response to an error signal, wherein the error signal is received from a device modeling an optical pick-up system.

18. The method of claim 14, further comprising:

modeling an optical-pickup system via a device;

generate, via the device modeling the optical-pickup system, an error signal in response to the first repeatable runout profile;

generating, via a compensator, a feedback control signal in response to the error signal;

based on an output of the compensator, generating, via a feedforward control device, a feedforward control signal to suppress repeatable runout associated with the at least one sector; and generating, via the device modeling the optical-pickup system, the error signal based on (i) the feedback control signal, and (ii) the feedforward control signal.

19. The method of claim 18, further comprising:

filtering the feedback control signal via a low pass filter;

filtering an output of the feedforward control device via a finite impulse response filter;

generating a first sum including summing (i) an output of the low pass filter, and (ii) an output of the finite impulse response filter;

generating the feedforward control signal in response to the first sum;

generating a second sum including summing the feedback control signal and the feedforward control signal; and generating, via the device modeling the optical-pickup system, the error signal based on the second sum.

20. The method of claim 14, further comprising:

learning repeatable runout profiles of two or more of the at least one sector;

assembling the repeatable runout profiles of the two or more sectors to form the second repeatable runout profile; and subsequent to replacing the first repeatable runout profile with the second repeatable runout profile, suppressing repeatable runout of the two or more sectors based on the first repeatable runout profile.

* * * * *